(12) United States Patent
Muller et al.

(10) Patent No.: US 9,342,287 B2
(45) Date of Patent: May 17, 2016

(54) SOFTWARE PROGRAM RATINGS

(75) Inventors: Max Muller, San Jose, CA (US); Ricardo D. Cortes, Los Gatos, CA (US); Aloke Bhatnagar, Campbell, CA (US)

(73) Assignee: Apple Inc., Cupertino, CA (US)

( * ) Notice: Subject to any disclaimer, the term of this patent is extended or adjusted under 35 U.S.C. 154(b) by 1704 days.

(21) Appl. No.: 12/171,171

(22) Filed: Jul. 10, 2008

(65) Prior Publication Data

US 2010/0011336 A1 Jan. 14, 2010

Related U.S. Application Data

(60) Provisional application No. 61/050,478, filed on May 5, 2008, provisional application No. 61/059,792, filed on Jun. 8, 2008, provisional application No. 61/059,790, filed on Jun. 8, 2008.

(51) Int. Cl.
*G06F 17/30* (2006.01)
*G06F 9/445* (2006.01)
*G06Q 30/02* (2012.01)
*G06Q 30/06* (2012.01)

(52) U.S. Cl.
CPC .............. *G06F 8/60* (2013.01); *G06Q 30/0278* (2013.01); *G06Q 30/06* (2013.01)

(58) Field of Classification Search
CPC ................................................ G06F 17/30864
See application file for complete search history.

(56) References Cited

U.S. PATENT DOCUMENTS

| | | | | |
|---|---|---|---|---|
| 5,537,618 A | * | 7/1996 | Boulton et al. | 715/745 |
| 5,583,576 A | * | 12/1996 | Perlman et al. | 725/28 |
| 5,973,683 A | * | 10/1999 | Cragun et al. | 715/719 |
| 6,125,259 A | * | 9/2000 | Perlman | 725/28 |
| 6,199,193 B1 | * | 3/2001 | Oyagi et al. | 717/101 |
| 7,073,193 B2 | * | 7/2006 | Marsh | 725/114 |
| 2003/0093790 A1 | * | 5/2003 | Logan et al. | 725/38 |
| 2005/0081043 A1 | * | 4/2005 | Evans | H04N 7/162 713/182 |
| 2005/0216457 A1 | * | 9/2005 | Walther et al. | 707/4 |
| 2005/0246740 A1 | * | 11/2005 | Teraci et al. | 725/45 |
| 2007/0256093 A1 | * | 11/2007 | Hiler | 725/28 |
| 2007/0260603 A1 | * | 11/2007 | Tuscano | G06F 17/30867 |
| 2008/0040748 A1 | * | 2/2008 | Miyaki | 725/46 |
| 2008/0320568 A1 | * | 12/2008 | Hawkins et al. | 726/5 |
| 2009/0265731 A1 | * | 10/2009 | Eyer et al. | 725/28 |

(Continued)

OTHER PUBLICATIONS

"Ratings Process", Entertainment Software Rating Board, downloaded Jul. 1, 2008.
"Gaming Ratings & Descriptor Guide", Entertainment Software Rating Board, downloaded Jul. 1, 2008.
U.S. Appl. No. 12/286,076, entitled "Electronic Submission and Management of Digital Products for Network-Based Distribution", filed Sep. 26, 2008.

(Continued)

*Primary Examiner* — Robert Beausoliel, Jr.
*Assistant Examiner* — Nirav K Khakhar
(74) *Attorney, Agent, or Firm* — DLA Piper LLP (US)

(57) ABSTRACT

Improved approaches for rating a software program are disclosed. The rating can be automatically determined from a plurality of user characterizations. The user characterizations can be designated by a user (e.g., developer or publisher) with respect to a plurality of content descriptors. The user characterizations can be supplied by the user on submitting a software program to an online distribution system. Once a rating is determined and associated with a software program, the rating can be used to influence availability of the software program from an online distribution system. The rating (or how the rating influences availability) can be dependent on geographical region. The rating being determined can also be influenced by rating rules.

30 Claims, 8 Drawing Sheets

(56) References Cited

U.S. PATENT DOCUMENTS

2010/0011392 A1* 1/2010 Bronstein .......... G06K 9/00758
 725/28
2013/0185291 A1* 7/2013 Tyndall ............ G06F 17/30867
 707/723

OTHER PUBLICATIONS

U.S. Appl. No. 12/286,092, entitled "Electronic Submission of Application Programs for Network-Based Distribution", filed Sep. 26, 2008.

* cited by examiner

| Content Descriptors | None | Infrequent/Mild | Frequent/Intense |
|---|---|---|---|
| Cartoon or Fantasy Violence | ● | ○ | ○ |
| Realistic Violence | ● | ○ | ○ |
| Sexual Conduct or Nudity | ● | ○ | ○ |
| Profanity or Crude Humor | ● | ○ | ○ |
| Alcohol, Tobacco, or Drug Use or References | ● | ○ | ○ |
| Mature/Suggestive Themes | ● | ○ | ○ |
| Simulated Gambling | ○ | ○ | ● |
| Horror/Fear Themes | ● | ○ | ○ |
| Prolonged graphic or sadistic realistic violence | ● | ○ | ○ |
| Graphical sexual content and nudity | ● | ○ | ○ |

SOFTWARE PROGRAM RATINGS

CROSS-REFERENCE TO OTHER APPLICATIONS

This application references and/or incorporates: (i) U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference; (ii) U.S. Provisional Patent Application No. 61/059,792, filed Jun. 8, 2008, entitled "ELECTRONIC SUBMISSION OF APPLICATION PROGRAMS FOR NETWORK-BASED DISTRIBUTION", which is hereby incorporated herein by reference; and (iii) U.S. Provisional Patent Application No. 61/059,790, filed Jun. 8, 2008, entitled "NETWORK-BASED DISTRIBUTION OF APPLICATION PRODUCTS", which is hereby incorporated herein by reference.

BACKGROUND OF THE INVENTION

1. Field of the Invention

The present invention relates to updates for software programs and, more particularly, to ratings for software programs.

2. Description of the Related Art

Software programs are commonly available for purchase (or license) at brick-and-mortar stores as well as online stores. A software program is often purchased as a compact disc (CD) or digital versatile disk (DVD) containing the software program. Alternatively, purchasers can purchase and download a software program from an online retailer or software provider's website.

Like movie ratings, software games can be rated. The ratings provide potential purchasers with information on suitability of software games to different age groups. The rating for a software game can be determined by an independent rating board. One known rating board is the Entertainment Software Rating Board (ESRB) which rates software games for game publishers. Examples of ratings used by ESRB include: EC (Early Childhood), E (Everyone), E10+ (Everyone 10 and older), T (Teen), M (Mature), and AD (Adults Only).

To obtain a rating from the ESRB, a game publisher submits a written ESRB questionnaire specifying pertinent content within the software game. Additionally, the game publisher must submit a videotape or DVD which captures all pertinent content, including the most extreme instances, across all relevant categories including but not limited to violence, language, sex, controlled substances and gambling. ESRB then determines a rating for the software game and so informs the game publisher. The game publisher, if unsatisfied, can appeal the rating to an appeal board or revise the game and resubmit the revised game for a rating.

Unfortunately, however, it is costly and time consuming to obtain a rating from a rating board. While a rating board is a useful option for larger game publishers, the costs and delays associated with obtaining a rating from a rating board are burdensome on small game publishers. Moreover, for worldwide distribution of a software game, game publishers need to obtain and utilize ratings from various different rating boards, which can be burdensome on all game publishers.

Accordingly, there is a need for improved approaches to rating software programs.

SUMMARY OF THE INVENTION

The invention pertains to rating a software program. The rating can be automatically determined from a plurality of user characterizations. The user characterizations can be designated by a user (e.g., developer or publisher) with respect to a plurality of content descriptors. The user characterizations can be supplied by the user on submitting a software program to an online distribution system. Once a rating is determined and associated with a software program, the rating can be used to influence availability of the software program from an online distribution system. The rating (or how the rating influences availability) can be dependent on geographical region. The rating being determined can also be influenced by rating rules.

The invention can be implemented in numerous ways, including as a method, system, device, apparatus (including computer readable medium and graphical user interface). Several embodiments of the invention are discussed below.

As a computer-implemented method for determining a rating for a software program, one embodiment of the invention can, for example, include at least: displaying a plurality of content descriptors; receiving a user characterization for each of the content descriptors with respect to the software program; and determining a rating for the software program based on the user characterizations.

As a method for distributing a software program from an online repository, one embodiment of the invention can, for example, include at least: receiving product information pertaining to a software program; receiving characterizations of content descriptors with respect to the software program; receiving at least one electronic file pertaining to the software program; receiving at least one distribution parameter to be used for the software program; and storing the at least one electronic file pertaining to the software program to the online repository for distribution.

As a method for submitting a software product to an online repository for distribution, one embodiment of the invention can, for example, include at least: receiving product information pertaining to a software product to be submitted to the online repository; receiving characterizations of content descriptors with respect to the software product; uploading at least one electronic file pertaining to the software product; receiving at least one distribution parameter to be used for the software product; and submitting the software product to the online repository for distribution.

As a system for facilitating submission and management of digital products to be distributed online, one embodiment of the invention can, for example, include at least: a product management and distribution system configured to permit digital product providers to submit digital products and manage distribution of their digital products. The product management and distribution system can include at least a product submission module configured to receive submission of new digital products for distribution, where each of the new digital products being submitted can provide at least product information and product content characterization information. The product content characterization information can include at least characterizations of a plurality of content descriptors with respect to the corresponding digital product.

As a computer readable medium including at least computer program code for determining a rating for a software program, one embodiment of the invention can, for example, include at least: computer program code for displaying a plurality of content descriptors; computer program code for receiving a user characterization for each of the content descriptors with respect to the software program; and computer program code for determining a rating for the software program based on the user characterizations.

Other aspects of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF THE INVENTION

The invention pertains to rating a software program. The rating can be automatically determined from a plurality of user characterizations. The user characterizations can be designated by a user (e.g., developer or publisher) with respect to a plurality of content descriptors. The user characterizations can be supplied by the user on submitting a software program to an online distribution system. Once a rating is determined and associated with a software program, the rating can be used to influence availability of the software program from an online distribution system. The rating (or how the rating influences availability) can be dependent on geographical region. The rating being determined can also be influenced by rating rules.

Embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1:
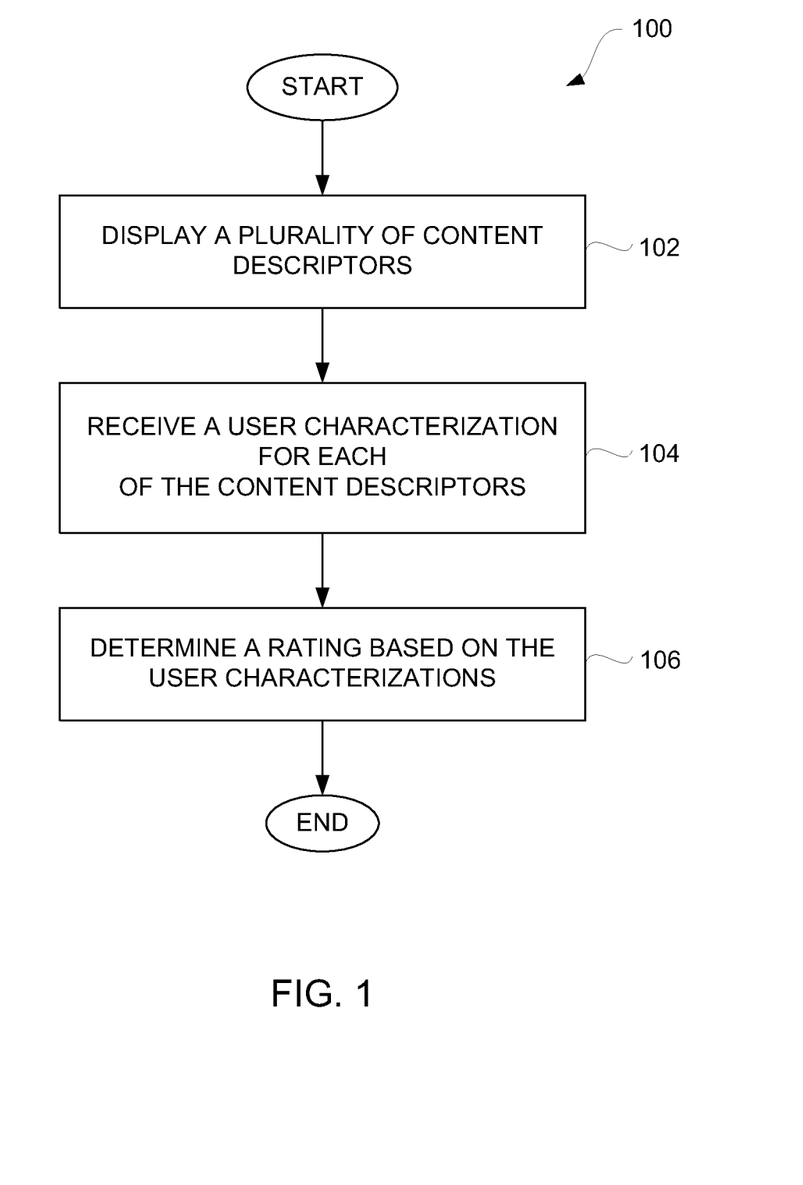
FIG. 1 is a flow diagram of a rating process according to one embodiment of the invention.

FIG. 1 is a flow diagram of a rating process 100 according to one embodiment of the invention. The rating process 100 is performed by a computing device, such as a client device or a server device.

The rating process 100 can display 102 a plurality of content descriptors. The content descriptors pertain to a plurality of descriptive categories that pertained to a digital product. As an example, the digital product can be a software program. The software program is a computer program that can be executed on a computing device. The computing device can be a handheld, portable, desktop or rack-mounted computing device. The rating process 100 can then receive 104 a user characterization for each of the content descriptors with respect to the software program. In one implementation, a user can inform the computing device of their characterization of each of the content descriptors being displayed 102. Thereafter, a rating can be determined 106 based on the user characterizations. Following the block 106, the rating process 100 can end.

In one embodiment, a user can provide user characterizations of a plurality of different content descriptors using a graphical user interface presented on a display associated with the computing device. The graphical user interface can include user interface controls that assist the user in providing the user characterizations. In one embodiment, the graphical user interface can have a table arrangement. The table arrangement can have a plurality of rows, where each row pertains to one of the content descriptors. The table arrangement can also have a plurality of columns, where each column contains separate characterizations for such content descriptors. In one embodiment, the characterizations can be selected from predetermined characterization options. Hence, the user can interact with the graphical user interface to select one of the predetermined characterization options for each of the corresponding content descriptor.

Figure 2A:
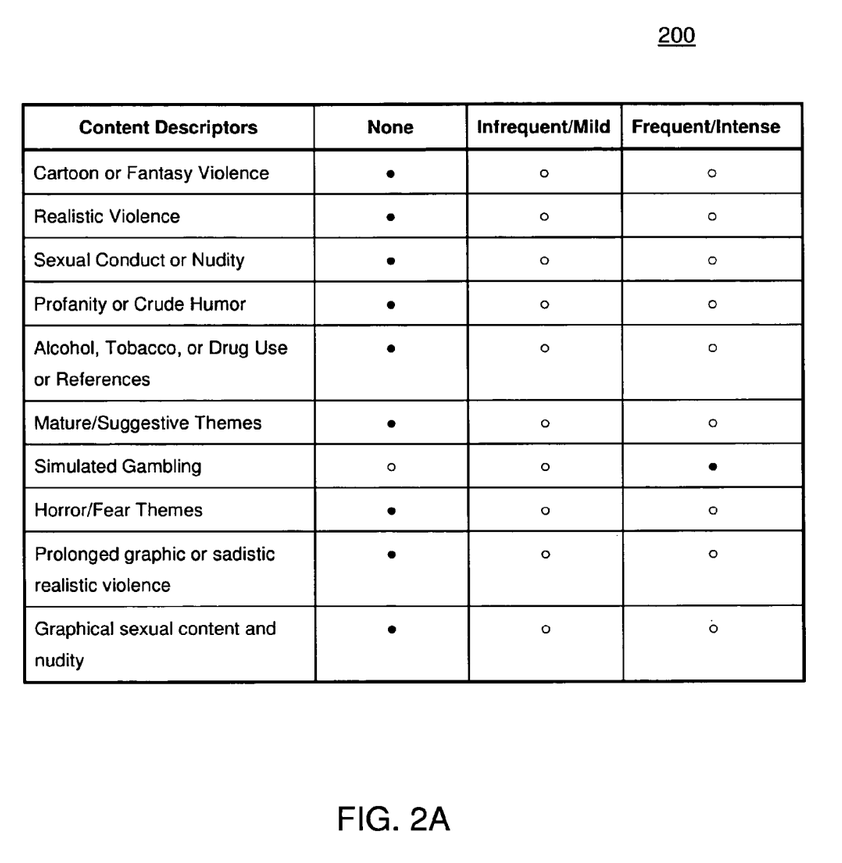
FIG. 2A is exemplary graphical user interface according to one embodiment on the invention.

FIG. 2A is exemplary graphical user interface 200 according to one embodiment on the invention. The exemplary graphical user interface 200 includes a row-column configuration with content descriptors listed along the rows and with selectable user characterizations listed along the columns. In the exemplary graphical user interface 200 illustrated in FIG. 2A, the content descriptors displayed in the rows include: Cartoon or Fantasy Violence; Realistic Violence; Sexual Conduct or Nudity; Profanity or Crude Humor; Alcohol, Tobacco, or Drug Use or References; Mature/Suggestive Themes; Simulated Gambling; Horror/Fear Themes; Prolonged graphic or sadistic realistic violence; and Graphical sexual content and nudity. Also, the selectable user characterizations in the columns can pertain to a level of frequency or intensity. More particularly, the selectable user characterizations in the exemplary graphical user interface 200 illustrated in FIG. 2A include: None, Infrequent/Mild, Frequent/intense.

Figure 2B:
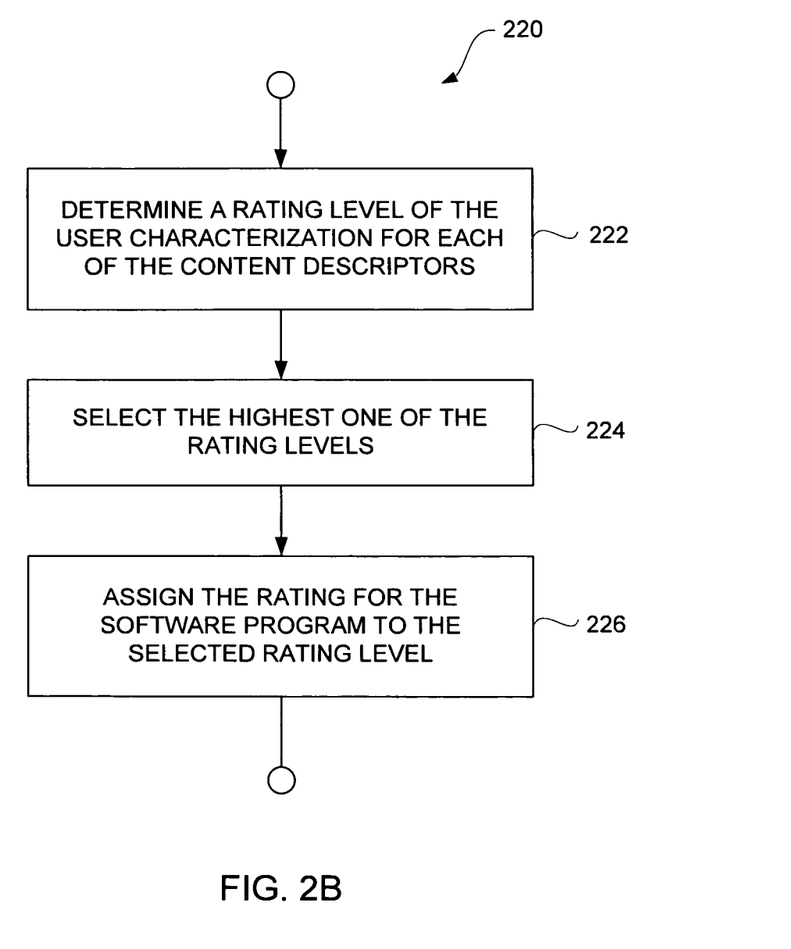
FIG. 2B is a flow diagram of a rating determination process according to one embodiment of the invention.

FIG. 2B is a flow diagram of a rating determination process 220 according to one embodiment of the invention. The rating determination process 220 can, for example, pertain to rating determination processing performed by the block 106 of the rating process 100 illustrated in FIG. 1. In the rating determination process 220, a rating level of the user characterization for each of the content descriptors can be determined 222. The highest one of the rating levels can then be selected 224. Thereafter, the rating for the software program can be assigned 226 to the selected rating level. Following the assignment 226 of the rating, the rating determination process 220 can end.

In one embodiment, rating levels can be determined in accordance with the following Table I for the user characterizations of each of a plurality of content descriptors.

TABLE I

| Content Descriptors | Infrequent/Mild | Frequent/Intense |
| --- | --- | --- |
| Cartoon or Fantasy Violence | 9+ | 9+ |
| Realistic Violence | 9+ | 12+ |
| Sexual Conduct or Nudity | 12+ | 17+ |
| Profanity or Crude Humor | 9+ | 12+ |
| Alcohol, Tobacco, or Drug Use or References | 12+ | 17+ |
| Mature/Suggestive Themes | 9+ | 17+ |
| Simulated Gambling | 12+ | 17+ |
| Horror/Fear Themes | 9+ | 12+ |
| Prolonged graphic or sadistic realistic violence | Adult Only | Adult Only |
| Graphical sexual content and nudity | Adult Only | Adult Only |

For example, with respect to the ten (10) different content descriptors illustrated in FIG. 2A, the user characterizations indicated by the user for a particular software application might be respectively assigned to the following user characterizations as provided in Table II.

TABLE II

| Content Descriptors | None | Infrequent/Mild | Frequent/Intense |
|---|---|---|---|
| Cartoon or Fantasy Violence | ● | ○ | ○ |
| Realistic Violence | ● | ○ | ○ |
| Sexual Conduct or Nudity | ● | ○ | ○ |
| Profanity or Crude Humor | ● | ○ | ○ |
| Alcohol, Tobacco, or Drug Use or References | ● | ○ | ○ |
| Mature/Suggestive Themes | ○ | ● | ○ |
| Simulated Gambling | ○ | ○ | ● |
| Horror/Fear Themes | ● | ○ | ○ |
| Prolonged graphic or sadistic realistic violence | ● | ○ | ○ |
| Graphical sexual content and nudity | ● | ○ | ○ |

As indicated in Table II, the content descriptor for "Mature/Suggestive Themes" has a user characterization of "Infrequent/Mild", and the content descriptor for "Simulating Gambling" has a user characterization of "Frequent/intense". These user characterizations then respectively correlate to rating levels of 9+ and 17+, as provided in Table I. Of these rating levels, the rating level of 17+ is the highest of the rating levels. The rating for the software program can then be assigned to the highest rating level. Hence, in this example, the rating for the software program is 17+. Here, in this representative example, the rating for the software program is exclusively determined from the user characterizations.

As noted above, a rating for a software program can be exclusively determined from user characterizations. However, a rating for a software program can alternatively or additionally be determined by a rating rule. A rating rule can also be referred to as a policy rule since a policy can be set to impose a rule used in determining a rating.

Figure 2C:
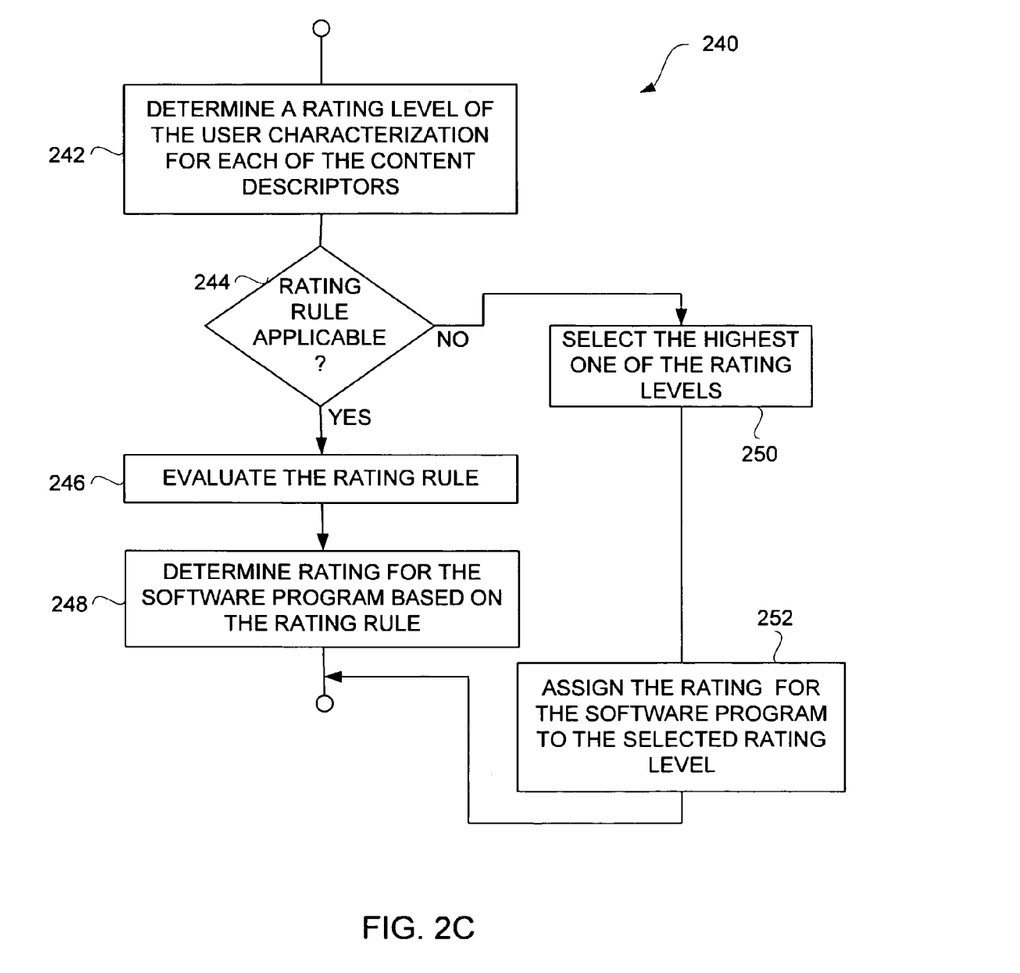
FIG. 2C is a flow diagram of a rating determination process according to another embodiment of the invention.

FIG. 2C is a flow diagram of a rating determination process 240 according to one embodiment of the invention. The rating determination process 240 can, for example, pertain to processing performed by the block 106 of the rating process 100 illustrated in FIG. 1.

The rating determination process 240 can determine 242 a rating level of the user characterization for each of the content descriptors. A decision 244 can then determine whether a rating rule is applicable. In this embodiment, the rating determination process 240 can make use of one or more rating rules to determine a rating (or impact the determination of the rating) to be applied to a software program. In one embodiment, the rating rules are dependent upon the user characterizations. For example, a rating rule could state that if user characterizations indicate high levels of three different content descriptors (of undesired characteristics) pertaining to undesired content of the software program, then a rating can be set to an Adult Only rating. The Adult Only rating can cause the associated software application to be unavailable for distribution. More generally, when the decision 244 determines that a rating rule is applicable, the rating rule can be evaluated 246. In one implementation, the rating rule is a rule that determines a rating based on a rating level of one or more user characterizations for one or more of the content descriptors. After the rating rule has been evaluated 246, a rating for the software program can be determined 248 based on the rating rule.

On the other hand, when the decision 244 determines that a rating rule is not applicable, the highest one of the rating levels determined 242 by the user for each of the user characterizations can be selected 250. After the highest one of the rating levels is selected 250, the rating for the software program can be assigned 252 to the selected rating level. Following the block 248 or 252, the rating determination process 240 can end.

Figure 3:
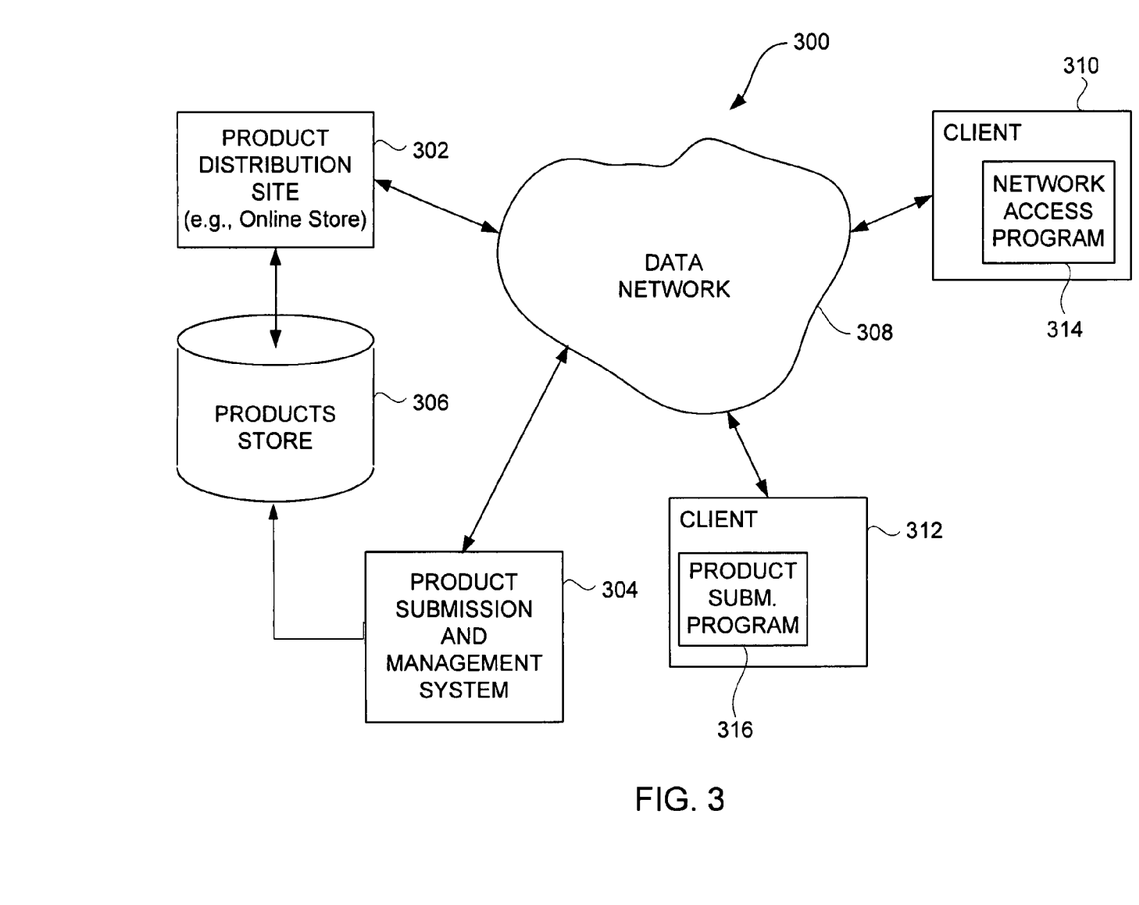
FIG. 3 is a block diagram of a product submission and distribution system according to one embodiment of the invention.

FIG. 3 is a block diagram of a product submission and distribution system 300 according to one embodiment of the invention. The product submission and distribution system 300 includes a product distribution site 302. The product distribution site 302 provides an online access point for distribution of various digital products. For example, the product distribution site 302 can also be referred to as an online product hosting site or an online store.

A product submission and management system 304 operates to receive submissions of digital products from various digital product submitters. The product submission and management system 304 can process submission of digital products and authorize distribution of approved digital products. The digital products can be stored in a products store 306. In one embodiment, the products store 306 includes a mass data store and one or more databases. The products store 306 provides mass storage of the numerous digital products that are available for distribution (e.g., purchase or rental). For example, digital products that have been purchased can be accessed from the products store 306 over a data network 308 by way of the product distribution site 302. Also, purchases made by users can be maintained as purchase history data by the product submission and distribution system 300. For example, the purchase history data can be stored in a database or file at any of a variety of locations, such as the product submission and management system 304, the production distribution site 302 or the products store 306. In one embodiment, the digital products are computer program products (e.g., computer software programs). Examples of computer program products are: applications (or application programs), animations, or presentations.

The product submission and distribution system 300 also includes a first client 310 and a second client 312. Typically, the product submission and distribution system 300 would include a plurality of different clients 310, 312. The first client 310 includes a network access program 314. The second client 312 includes a product submission program 316. Some clients can also include both the network access program 314 and the product submission program 316. The network access program 314 is an application program (e.g., software program) that operates on the first client 310, which is a computing device. One example of a suitable network access program is a network browser (e.g., Microsoft Explorer or Safari). Another example of a suitable network access program is iTunes™ offered by Apple Inc. The first client 310 is coupled to the product distribution site 302 through the data network 308. Hence, any of the first clients 310 can interact with the product distribution site 302 to review, purchase and/or manage digital products.

The product submission program 316 is also an application program (e.g., software application) that operates on the second client 312, which is a computing device. The product submission program 316 is used to submit digital products to the product submission and management system 304 for eventual distribution by the media distribution site 302. Although the network access program 314 and the product submission program 316 are shown in FIG. 3 as separate programs, it should be understood that such programs can be integrated into a single program or reside on the same client machine.

In the product submission and distribution system 300 shown in FIG. 3, the digital products are submitted to the product submission and management system 304 by way of the product submission program 316. The digital products that have been submitted (e.g., via the second client 312) are processed and then stored in the products store 306. Thereafter, the stored digital products are available to be purchased from the product distribution site 302. Upon purchasing a particular digital product, the product distribution site 302 permits the digital data for the particular digital product to be retrieved from the products store 306 and then delivered (e.g., downloaded) from the product distribution site 302 to the requesting client 310 through the data network 308. In this regard, the product distribution site 302 or some other delivery server (not shown) obtains the digital data corresponding to the particular digital product from the products store 306 and downloads such digital data through the data network 308 to the client 310. The downloaded digital data can then be stored on the client 310. In one embodiment, the downloaded digital data is encrypted as received at the client 310 but is decrypted and then perhaps re-encrypted before persistently stored on the client 310. Thereafter, the client 310 can utilize (e.g., execute) the digital data of the digital product at the client 310.

The product submission and distribution system 300 allows a user of the client 310 to utilize the network access program 314 to browse, search or sort through a plurality of digital products that can be purchased from the product distribution site 302. The network access program 314 may also allow the user to preview or demo some or all of a digital product. In the event that the user of the network access program 314 desires to purchase a particular digital product, the user (via the network access program 314) and the product distribution site 302 can engage in an online commerce transaction in which the user pays for access rights to the particular digital product. In one embodiment, a credit card associated with the user is credited for a purchase (or rental amount) of the particular digital product.

The submission and purchase of the digital products can be achieved over the data network 308. In other words, the submission and purchase of the digital products can be achieved online. The purchase of media items online can also be referred to as electronic commerce (e-commerce). In one embodiment, the data network 308 can make use of at least a portion of the Internet. The clients 310, 312 can vary with application but generally are computing devices that have memory storage. Often, the clients 310, 312 are personal computers or other computing devices that are capable of storing and presenting media to their users. In one embodiment, the connections through the data network 308 between the product distribution site 302 and the clients 310, 312 can be through secure connections, such as Secure Sockets Layer (SSL).

Although the product distribution site 302, the product submission and management system 304 and the products store 306 are shown in FIG. 3 as being separate components, it should be understood that any of these components can be combined into one or more apparatus. For example, the product submission and management system 304 can be incorporated into the product distribution site 302. As another example, the products store 306 can be incorporated into the product distribution site 302 or the product submission and management system 304.

Additional details on the product submission and management system 304 can be found in U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

Figure 4:
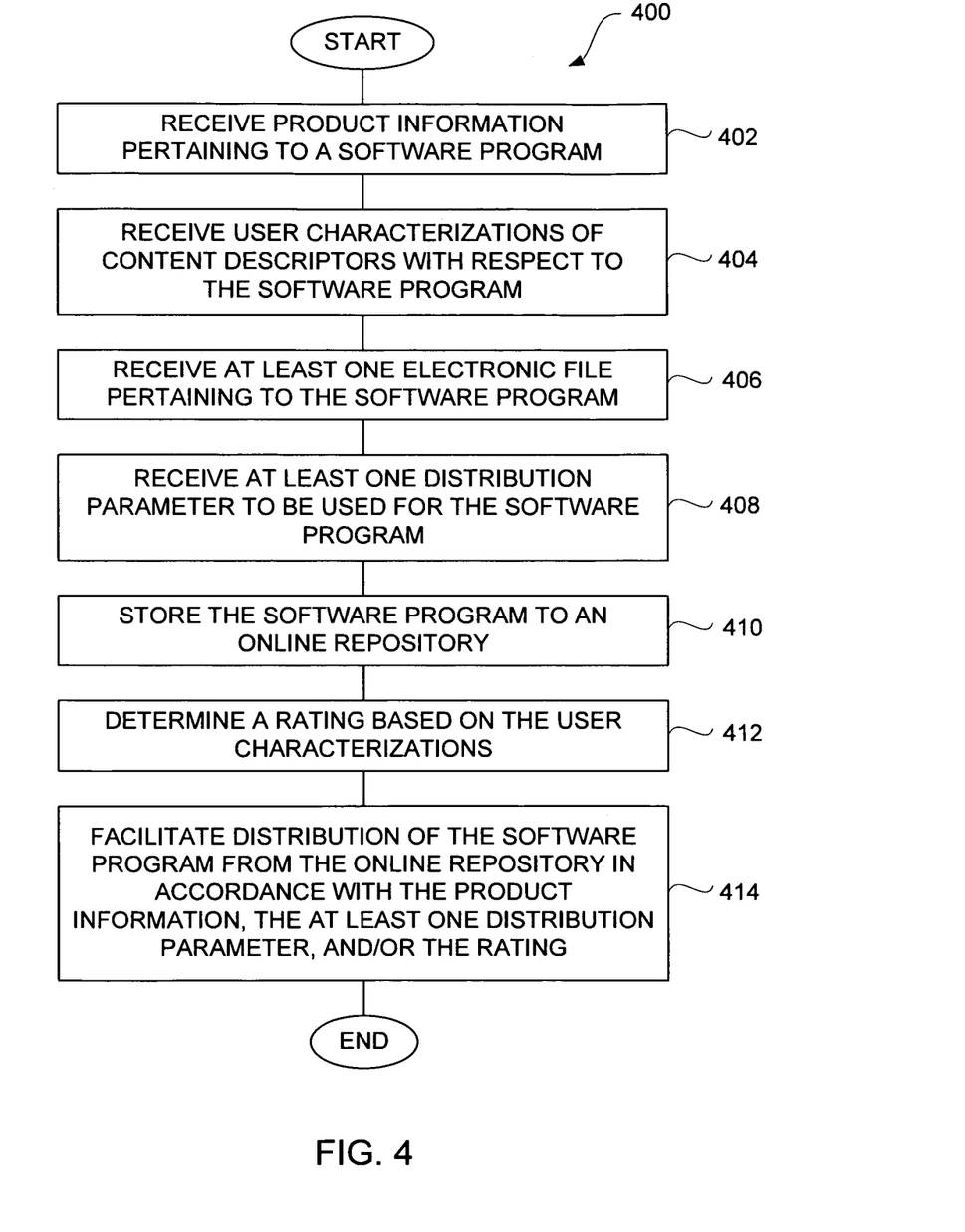
FIG. 4 is a software program submission process according to one embodiment of the invention.

FIG. 4 is a software program submission process 400 according to one embodiment of the invention. The software program submission process 400 can, for example, be performed by the product submission and management system 304 illustrated in FIG. 3.

The software program submission process 400 can receive 402 product information pertaining to a software program. Further, user characterizations of content descriptors with respect to the software program can be received 404. Also, at least one electronic file pertaining to the software program can be received 406. Typically, the electronic file contains the executable program code of the software program. Further, at least one distribution parameter to be used for the software program can be received 408. A distribution parameter is a parameter that can be utilized to control or influence the manner in which the software program is able to be distributed. One example of a distribution parameter is a pricing parameter. As an example, a pricing parameter can specify a price or a price tier to be associated with the software program. Other distribution parameters can pertain to digital storefronts from which the digital product is to be distributed from (i.e., geographic availability). Still further, distribution parameters could also pertain to preview eligibility, license categories (types), etc.

The software program submission process 400 can also store 410 the software program to an online repository. For example, the online repository can store software programs that are made available for distribution through an online store. The software program submission process 400 further operates to determine 412 a rating for the software program based on at least the user characterizations. Still further, these software program submission process 400 can facilitate 414 distribution of the software program from the online repository. More particularly, the distribution of the software program from the online repository can be performed in accordance with the product information, the at least one distribution parameter, and/or the rating. Following the block 414, the software program submission process 400 can end.

Figure 5:
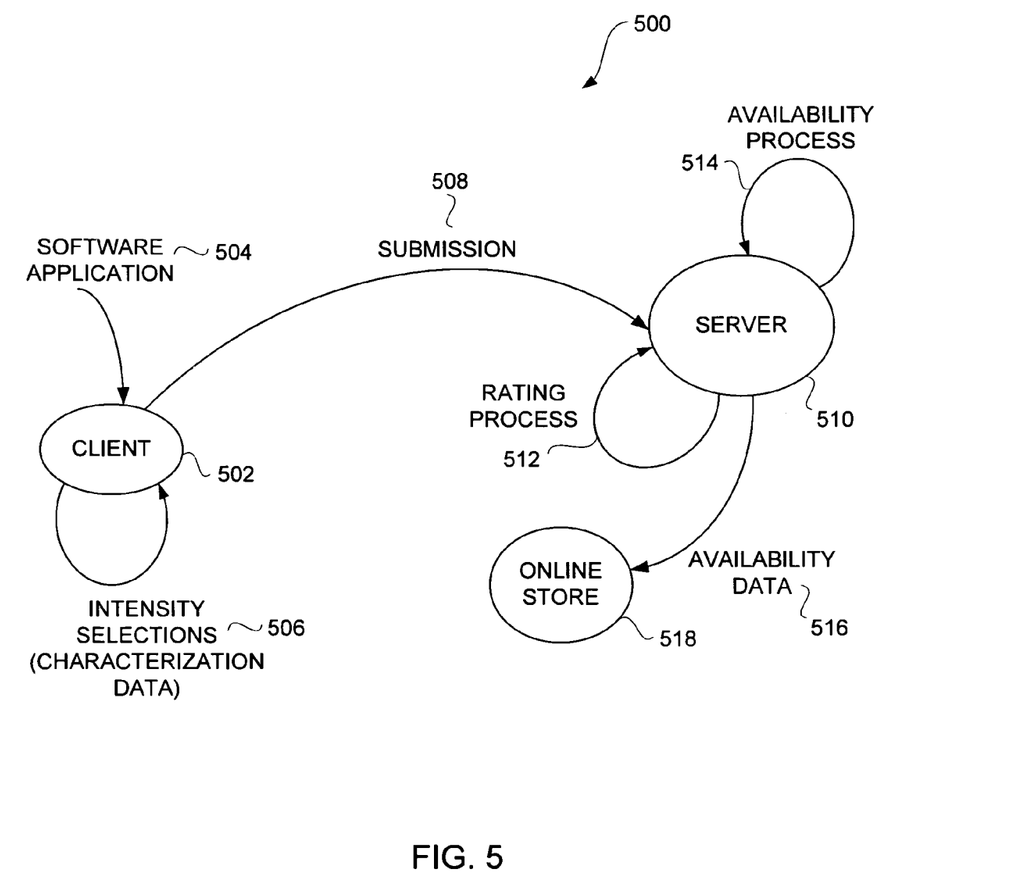
FIG. 5 illustrates an exemplary state diagram according to one embodiment of the invention.

FIG. 5 illustrates an exemplary state diagram 500 according to one embodiment of the invention. In the state diagram 500 a client 502 receives a software application 504. Here, the software application 504 is being identified or provided to the client 502. Through user interaction, intensity selections 506 can be associated with the software application. The intensity selections 506 can pertain to characterization data. Then, the software application 504 together with the intensity selections 506 can be packaged together as a submission 508 to a server 510. The server 510 can implement a rating process 512 to determine a rating for the software application. In one embodiment, the rating process 512 makes use of the intensity selections 506 that were submitted to the server 510. The server 510 can also implement an availability process 514. The availability process 514 can determine which of one or more geographic regions the software application is available for distribution. In one embodiment, the rating associated with the software application can influence where the software application is available for distribution. An online store 518 renders the software application 504 available for online distribution. The server 510 can provide availability data 516 to the online store 518. The availability data 516 is data produced by the availability process 514 and informs the online store as to which of the one or more geographic areas that the software application 504 is available for online distribution.

Figure 6:
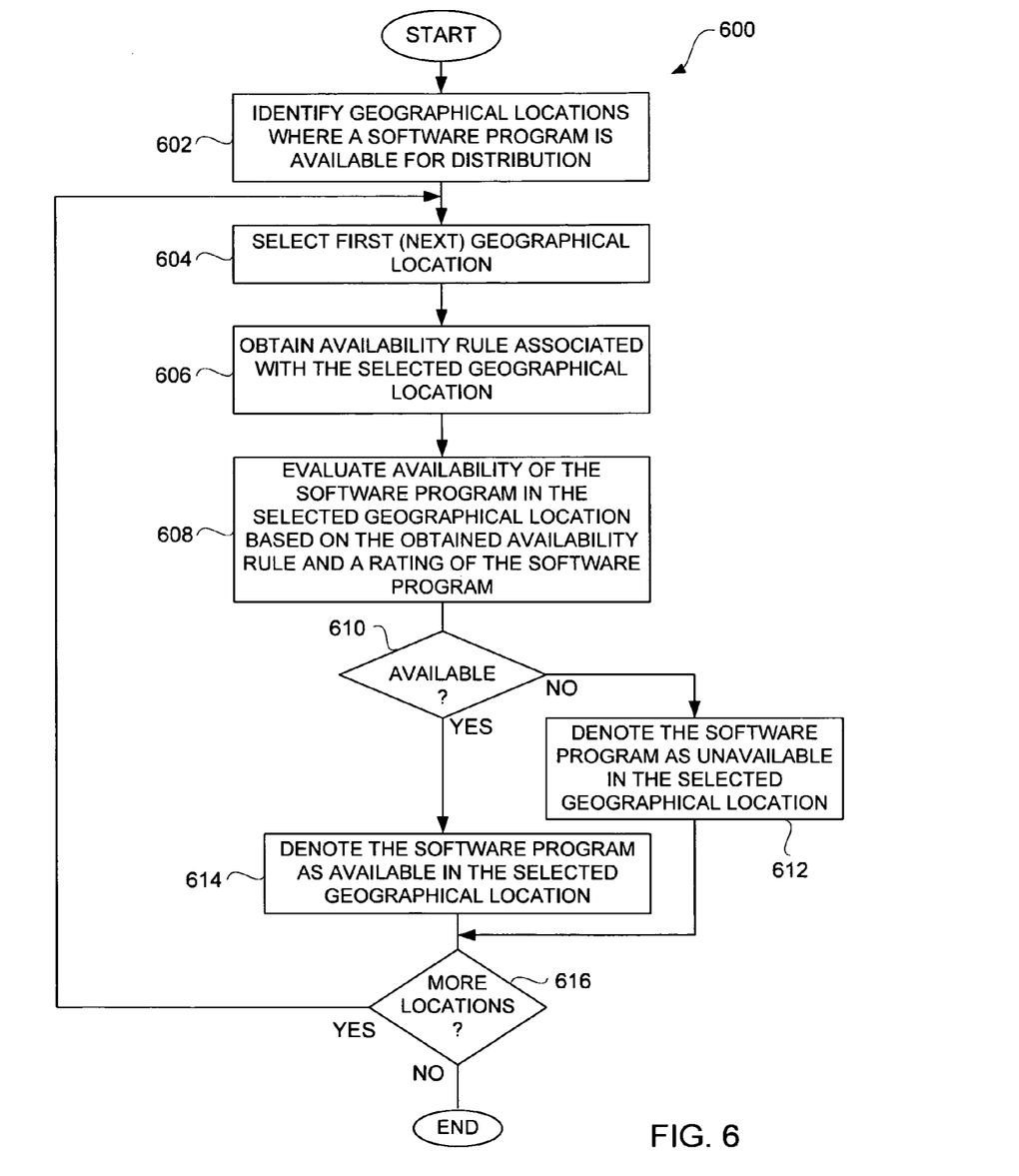
FIG. 6 is a flow diagram of software program availability process according to one embodiment of the invention.

FIG. 6 is a flow diagram of software program availability process 600 according to one embodiment of the invention. The software program availability process 600 can, for example, be performed by a server device.

The software program availability process 600 can identify 602 geographical locations where a software program is available for distribution. Then, a first geographical location can be selected 604 for processing. An availability rule associated with the selected geographical location can be obtained 606. The availability of the software program in the selected geographical location can then be evaluated 608 based on the obtained availability rule and a rating of the software program. For example, based on a rating, an available rule can render a software program unavailable.

Next, a decision 610 determines whether the software program is available in the selected geographical location. When the decision 610 determines that the software program is not available in the selected geographical location, the software program can be denoted 612 as is being unavailable in the selected geographical location. Alternatively, when the decision 610 determines that the software program is available in the selected geographical location, the software program can be denoted 614 as available in the selected geographical location.

Next, following either the block 612 or the block 614, a decision 616 can determine whether there are more geographical locations to be processed. When the decision 616 determines that there are more geographical locations to be processed, the software program availability process 600 can return to repeat the block 604 so that a next geographical location can be selected 604 and further processing at blocks 604 through 616 can be performed. Alternatively, when the decision 616 determines that there are no more geographical locations to be processed, the software program availability process 600 can end.

Moreover, ratings systems or sensitivities can vary geographically, such as in different countries, A game rating for a game to be distributed in the United Kingdom can receive a different (e.g., higher) rating than if the game were rated in the United Kingdom than in the United States. In one embodiment, a rating rule can be used to impose a higher rating for the United Kingdom.

Rating can be presented to users of an online store when browsing or review information on software programs available for purchase. The rating provide users with an indication of suitability of the software programs to different age groups. Ratings can also be use by parental control feature of a network access program (e.g., iTunes™) to limit accessibility to software programs based on level of rating.

As noted above, rating for software programs can be based on user characterizations. An online store can also permit other users to inform the online store of software programs that may have an inaccurate rating. As appropriate, software programs that are noted (e.g., flagged) as being inaccurately rated can be remove from the online store, personally reviewed, and/or cause developers/publishers to receive a warning. Hence, other users can provide monitor for the ratings of the software programs made available for distribution via an online store.

This application also references and/or incorporates: (1) U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION", which is hereby incorporated herein by reference; (2) U.S. patent application Ser. No. 11/712,303, filed Feb. 27, 2007, and entitled "PROCESSING OF METADATA CONTENT AND MEDIA CONTENT RECEIVED BY A MEDIA DISTRIBUTION SYSTEM", which is hereby incorporated herein by reference; (3) U.S. patent application Ser. No. 11/609,815, filed Dec. 12, 2006, and entitled "TECHNIQUES AND SYSTEMS FOR ELECTRONIC SUBMISSION OF MEDIA FOR NETWORK-BASED DISTRIBUTION", which is hereby incorporated herein by reference; (4) U.S. patent application Ser. No. 11/622,923, filed Jan. 12, 2007, and entitled "COMPUTERIZED MANAGEMENT OF MEDIA DISTRIBUTION AGREEMENTS", which is hereby incorporated herein by reference; and (5) U.S. Provisional Patent Application No. 61/050,478, filed May 5, 2008, entitled "ELECTRONIC SUBMISSION AND MANAGEMENT OF DIGITAL PRODUCTS FOR NETWORK-BASED DISTRIBUTION", which is hereby incorporated herein by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different embodiments or implementations may, but need not, yield one or more of the following advantages. One advantage of certain embodiments of the invention is that ratings for software programs can be obtained in a simplified, cost-effective manner. Another advantage of certain embodiments of the invention is that ratings can be centrally determined for different geographical regions. Another advantage of certain embodiments of the invention is that previously determined ratings can be changed in a computer implemented manner if rating criteria used to determine the ratings changes. Still another advantage of certain embodiments of the invention is that rating rules can be used to deterministically set ratings. Yet still another advantage of certain embodiments of the invention is that once a rating is associated with a software program, the rating can be used to influence availability of the software program from an online distribution system.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for determining a rating for a software program, comprising:
displaying, on a display associated with a computing device, a plurality of content descriptors and options for user selection of both the frequency and intensity of the content in the software program by non-numerical selections;

receiving, from the computing device, a non-numerical user characterization selection for each of the content descriptors with respect to the software program;

associating a numerical rating level to each of the received non-numerical user characterization selections; and determining a content rating for the software program based on, the numerical rating level associated with each of the non-numerical user characterizations compared to a characterization specific rating rule and a geographical rule;

using the rating to influence geographical availability of the software.

2. The computer-implemented method as recited in claim 1, wherein said method further comprises:

assigning the rating to the software program.

3. The computer-implemented method as recited in claim 1, wherein said receiving comprises:

receiving a user selection of a level for each of the content descriptors.

4. The computer-implemented method as recited in claim 3, wherein the user selection of the level is a selection of one of a set of predetermined levels.

5. The computer-implemented method as recited in claim 3, wherein said determining of the rating is based on the user selections of the levels for the content descriptors.

6. The computer-implemented method as recited in claim 1, wherein said determining of the rating comprises:

selecting the highest rating level from the rating levels assigned to the user characterization for each of the content descriptors; and assigning the rating for the software program to the selected rating level.

7. The computer-implemented method as recited in claim 1, wherein said determining of the rating comprises:

identifying the rating rule;

evaluating the rating rule; and determining the rating for the software program based on the rating rule.

8. The computer-implemented method as recited in claim 7, wherein said evaluating evaluates the rating rule based on at least one of the rating levels.

9. The computer-implemented method as recited in claim 1, wherein the rating rule is the highest rating level from the numerical rating levels assigned to the user characterization for each of the content descriptors.

10. The computer-implemented method as recited in claim 1, wherein the rating is an age group rating.

11. The computer-implemented method as recited in claim 1, wherein said displaying comprises:

displaying a table having content descriptors on one axis and having a plurality of selectable levels on another axis.

12. The computer-implemented method as recited in claim 1, wherein said determining of the rating is based exclusively on one or more of the user characterizations.

13. The method of claim 1 wherein the characterization specific rating is at least one of, cartoon violence, fantasy violence, prolonged graphic violence, and sadistic realistic violence.

14. The method of claim 1 wherein the characterization specific rating is at least one of, sexual content, nudity, profanity, crude humor, mature themes, suggestive themes and horror themed.

15. The method of claim 1 wherein the characterization specific rating is at least one of, alcohol use, tobacco use, drug use, and simulated gambling.

16. A non-transitory computer readable medium including at least computer program code for determining a rating for a software program, the code comprising instructions for:

displaying a plurality of content descriptors;

receiving a non-numerical user characterization for each of the content descriptors with respect to the software program by user selectable features indicating a frequency each characterization appears in the software;

associating a numerical rating level to each of the received non-numerical user characterizations;

determining a rating for the software program based on geographical rating rules and the numerical rating level associated with each of the received non-numerical user characterizations; and using the rating to influence geographical availability of the software.

17. The computer readable medium of claim 16, further comprising:

computer program code for assigning the rating to the software program.

18. The computer readable medium of claim 16, wherein the computer program code for determining the rating further comprises:

computer program code for selecting the highest rating level from the rating levels assigned to the user characterization for each of the content descriptors; and computer program code for assigning the rating for the software program to the selected rating level.

19. The computer readable medium of claim 16, wherein the computer program code for determining the rating further comprises:

computer program code for identifying a rating rule to be applied;

computer program code for evaluating the rating rule; and computer program code for determining the rating for the software program based on the rating rule.

20. The computer readable medium of claim 16, wherein the computer program code for determining the rating further comprises:

computer program code for determining whether a rating rule is applicable;

if said computer program code for determining determines that the rating rule is applicable, computer program code for evaluating the rating rule based on at least one of the rating levels; and computer program code for determining the rating for the software program based on the rating rule; and if said computer program code for determining determines that the rating rule is not applicable, computer program code for selecting the highest rating level from the rating levels assigned to the user characterization for each of the content descriptors; and determining the rating for the software program based on the selected rating level.

21. The method of claim 16 wherein the characterization specific rating is at least one of, cartoon violence, fantasy violence, prolonged graphic violence, sadistic realistic violence, sexual content, nudity, profanity, crude humor, mature themes, suggestive themes horror themed, alcohol use, tobacco use, drug use, and simulated gambling.

22. An apparatus to determine a rating for a software program, comprising:
- a memory configured to store a plurality of content descriptors, a plurality of selectable user characterizations, and a plurality of rating levels;
- a display; and
- a processor configured to:
    - display, on the display, a plurality of content descriptors and selection choices for a user to select the intensity each characterization appears in the software;
    - receive a non-numerical user characterization selection for each of the content descriptors with respect to the software program;
    - associate one of the plurality of numerical rating levels to each of the received non-numerical user characterizations based on the received non-numerical selections;
    - determine a rating for the software program based on geographical rules and the numerical rating level associated with each of the received non-numerical user characterizations; and
    - use the rating to influence geographical availability of the software.

23. The apparatus of claim 22, wherein the processor is further configured to:
- assign the rating to the software program.

24. The apparatus of claim 22, wherein the processor is further configured to:
- select the highest rating level from the rating levels assigned to the user characterization for each of the content descriptors; and
- assign the rating for the software program to the selected rating level.

25. The apparatus of claim 22, wherein the processor is further configured to:
- identify a rating rule to be applied;
- evaluate the rating rule; and
- determine the rating for the software program based on the rating rule.

26. The apparatus of claim 25, wherein the processor is further configured to:
- evaluate the rating rule based on at least one of the rating levels.

27. The apparatus of claim 22, wherein the processor is further configured to:
- determine whether a rating rule is applicable; and
- if a rating rule is determined to be applicable, evaluate the rating rule based on at least one of the rating levels; and
- determine the rating for the software program based on the rating rule.

28. The apparatus of claim 27, wherein if the rating rule is not applicable, select the highest rating level from the rating levels assigned to the user characterization for each of the content descriptors; and
- determine the rating for the software program based on the selected rating level.

29. The apparatus of claim 22, wherein the rating is determined exclusively on one or more of the user characterizations from a single user.

30. The method of claim 22 wherein the characterization specific rating is at least one of, cartoon violence, fantasy violence, prolonged graphic violence, sadistic realistic violence, sexual content, nudity, profanity, crude humor, mature themes, suggestive themes horror themed, alcohol use, tobacco use, drug use, and simulated gambling.

* * * * *